United States Patent Office 3,801,633
Patented Apr. 2, 1974

3,801,633
N-SUBSTITUTED AMINO ACIDS HAVING
ANTIVIRAL EFFECTS
Shigeshi Toyoshima and Seizo Kanao, Tokyo, Takeshi Toyoda, Sagamihara, and Tadashi Suyama, Kawasaki, Japan, assignors to Ajinomoto Co., Inc., Tokyo, Japan
No Drawing. Filed Sept. 4, 1970, Ser. No. 69,993
Claims priority, application Japan, Sept. 6, 1969, 44/70,716
Int. Cl. C07c 103/30
U.S. Cl. 260—518 R
4 Claims

ABSTRACT OF THE DISCLOSURE

The following N-substituted amino acids were found to combat infection with influenza virus in vivo:

N-α-naphthylacetylleucine
N-4-nitrophenoxyacetyl-4-nitrophenylalanine
N-carboxymethylphenylalanine
N-benzylphenylalanine
N-furfurylphenylalanine
N-β-naphthylaminomethylalanine
N-β-naphthylaminomethylmethionine
6-(β-naphthylaminomethyl)-aminocaproic acid
N-lauroylphenylalanine
N-4-toluenesulfonyltryptophan
N-2-fluoroensulfonyl-β-alanine
N-2-fluorenesulfonylvaline
N-2-fluorenesulfonyl-4-nitrophenylalanine

---

This invention relates to certain N-substituted amino acids and to their use as therapeutic agents in combating infection with influenza virus.

It has been found that:

N-α-naphthylacetylleucine,
N-4-nitrophenoxyacetyl-4-nitrophenylalanine,
N-carboxy methylphenylalanine,
N-benzylphenylalanine,
N-furfurylphenylalanine,
N-β-naphthylaminomethylalanine,
N-β-naphthylaminomethylmethionine,
6-(β-naphthylaminomethyl)-aminocaproic acid,
N-lauroylphenylalanine,
N-4-toluenesulfonyltryptophan,
N-2-fluorenesulfonyl-β-alanine,
N-2-fluorenesulfonylvaline, and
N-2-fluorenesulfonyl-4-nitrophenylalanine are effective in vivo against influenza virus in amounts in which their toxicity is low. As will be shown in more detail hereinafter, the compounds of the invention compare favorably in their therapeutic index values with the known anti-viral compounds Amantadine and Rimantadine.

The compounds of the invention may be employed in the free acid form or in the form of their pharmaceutically acceptable salts, particularly the alkali metal salts, the alkaline earth metal salts, organic amine salts and the like, such as the sodium, potassium, magnesium, calcium, ammonium, monoethanolamine and diethanolamine salts which are generally more soluble in water than the free acids, and are not more toxic than the free acids in equimolecular amounts.

The compounds of the invention are administered orally or parenterally in therapeutic compositions which contain one or more of the compounds as active agents in combination with a pharmaceutical carrier which may be solid or liquid, depending on the intended mode of application. Liquid compositions may be formulated in a conventional manner for oral application or for injection in dosage unit form.

The solid compositions, such as tablets, pills, powders, or granules, are prepared by combining the active agents of the invention with solid pharmaceutical carriers conventional in themselves, such as calcium carbonate, lactose, sucrose, sorbitol, mannitol, starch, amylopectin, methylcellulose, or gelatin. Compacting of the comminuted ingredients may be facilitated by the use of magnesium stearate, calcium stearate, or polyethylene glycol.

Orally applicable liquid compositions may be emulsions, solutions, or suspensions of the active agents in water, liquid paraffin and like pharmaceutically acceptable inert liquids which may additionally contain surface active agents to keep the anti-viral agents and other ingredients dispersed in the liquid carrier, and adjuvants for improving the taste or odor of the composition, as is well known in itself.

In preparing compositions of the invention for parenteral application, it is preferred to disperse the N-substituted amino acids of the invention in sterilized water containing enough alkaline material to dissolve the active agents, and to transfer dosage units of the solution to vials which are sealed thereafter.

The compounds of the invention differ from each other in their therapeutic effects and in their toxicity, and the desired therapeutic effects may be achieved with some by a dosage of 200 mg. per day applied orally or 400 mg. per day applied parenterally, whereas others may need to be administered orally at a rate of 1,000 mg. per day or parenterally at 2,000 mg. per day. A single daily dose is preferred.

Those compounds of the invention which exist either in optically active (D or L) forms or in the optically inactive racemic form are equally effective in all forms.

Only N-carboxymethylphenylalanine, N-benzylphenylalanine, N-lauroylphenylalanine, and N-4-toluenesulfonyltryptophan were known heretofore. The other nine-N-substituted amino acids enumerated above are new, but are readily prepared by means of procedures known in themselves. The Schotten-Baumann reaction may be used in preparing the N-α-naphthylacetyl derivative of leucine, the N-4-nitrophenoxyacetyl derivative of 4-nitrophenylalanine, and the N-2-fluorenesulfonyl derivatives of β-alanine, valine, and 4-nitrophenylalanine. Furfural may be reacted with phenylalanine in an aqueous medium in the presence of sodium borohydride to N-furfurylphenylalanine, and β-naphthylamine may be reacted with alanine, methionine, or 6-aminocaproic acid in the presence of formaldehyde in preparing the N-β-naphthylaminomethyl derivatives of the last-mentioned amino acids.

The following examples further illustrate the preparation of the N-substituted amino acids of this invention, of their salts, and of compositions containing the active agents of the invention.

EXAMPLE 1

A mixture of 9.3 g. α-naphthaleneacetic acid and 4.6 g. phosphorus trichloride was heated for about one hour on a water bath maintained at 90° C. The mixture was then cooled, the supernatant liquid was decanted from the precipitated α-naphthylacetyl chloride, and the latter was dissolved in 30 ml. anhydrous ether.

The ether solution was added dropwise over a period of 20 minutes with stirring to a solution of 6.3 g. L-leucine in 20 ml. 10% sodium hydroxide solution mixed with a solution of 15.9 g. sodium carbonate in 100 ml. water at room temperature. Stirring was continued for three hours, and the reaction mixture was then made acid to Congo red with 6 N hydrochloric acid. The precipitated crystals of N-α-naphthylacetyl-L-leucine were filtered out, washed with water, and recrystallized from aqueous ethanol. 11.8 g. columnar crystals (78% yield) melting at 152° C. were obtained $[\alpha]_D^{25} = -22.07°$ (c.=1.675, absolute ethanol). The compound was identified by elementary analysis.

Calculated for $C_{18}H_{21}O_3N$ (percent): C, 72.21; H, 7.07; N, 4.67. Found (percent): C, 72.29; H, 7.16; N, 4.74.

EXAMPLE 2

A mixture of 4 g. 4-nitrophenoxyacetic acid and 20 ml. thionyl chloride was refluxed for one hour, and the unreacted thionyl chloride was removed by vacuum distillation. The residue of 4-nitrophenoxyacetyl chloride was dissolved in anhydrous ether.

Over a period of 20 minutes, the ether solution was added dropwise and with vigorous stirring to a solution of 4.2 g. DL-4-nitrophenylalanine in 20 ml. 10% sodium hydroxide mixed with a solution of 5.3 g. sodium carbonate in 50 ml. water. Stirring was continued after the addition for three hours, and crystalline N-4-nitrophenoxyacetyl-DL-4-nitrophenylalanine was precipitated by acidifying as in Example 1. After recrystallizing from aqueous dioxane, 6.0 g. of needle-shaped crystals were obtained (77% yield) and melted at 184° C. The compound was identified by elementary analysis.

Calculated for $C_{17}H_{15}O_8N_3$ (percent): C, 52.44; H, 3.88; N, 10.79. Found (percent): C, 52.69; H, 3.99; N, 10.63.

EXAMPLE 3

A mixture of 16.5 g. L-phenylalanine, 8 g. sodium hydroxide, 100 ml. water, and 9.5 g. monochloroacetic acid was heated on a steam bath for two hours. N-carboxymethyl-L-phenylalanine was precipitated from the reaction mixture with 38% hydrochloric acid, filtered off, washed with water and ether, and recrystallized from water. Flat needles melting at 243° C. were obtained in a yield of 17.4 g. (90%). $[\alpha]_D^{26} = +15.67°$ (c.=1.85, 1 N HCl).

Elementary analysis.—Calculated for $C_{11}H_{13}O_4N$ (percent): C, 59.16; H, 5.87; N, 6.27. Found (percent): C, 59.18; H, 5.92; N, 6.04.

EXAMPLE 4

A solution of 9.2 g. L-α-chloro-β-phenylpropionic acid, 3.8 g. glycine, and 4 g. sodium hydroxide in 50 ml. water was kept at 100° C. for 16 hours on a water bath. A small amount of insoluble material was filtered off, and crystalline N-carboxymethyl-D-phenylalanine was precipitated from the filtrate with acid, recovered by filtering, and washed with water. When recrystallized from aqueous ethanol, the needle-shaped crystals weighed 8.8 g. (80% yield) and melted at 243° C. $[\alpha]_D^{29} = -12.17$ (c.=1.807, 1 N HCl).

EXAMPLE 5

As in Example 3, 16.5 g. L-phenylalanine, 6 g. sodium hydroxide, 50 ml. water, 45 ml. ethanol, and 13 g. benzyl chloride were kept on a water bath at 100° C. for four hours, and the precipitated and recovered N-benzyl-L-phenylalanine was washed with water, ether, and ethanol and recrystallized from 40% acetic acid. The purified, needle-shaped crystals weighed 10.7 g. (42% yield) and melted at 234° C. $[\alpha]_D^{32} = +18.09°$ (c.=1.006, 0.2 N NaOH).

Elementary analysis.—Calculated for $C_{16}H_{17}O_2N$ (percent): C, 75.25; H, 6.71; N, 5.49. Found (percent): C, 75.34; H, 6.61; N, 5.58.

EXAMPLE 6

19.2 g. furfural was added to a solution of 33.0 g. L-phenylalanine in 100 ml. 2 N sodium hydroxide solution with stiring, and thereafter a solution of 2.88 g. sodium borohydride in a little water was added in small batches with ice cooling to keep the temperature at 15° C. The unreacted furfural was extracted with ether after two hours of stirring, and the aqueous layer was neutralized to pH 6.0 with dilute hydrochloric acid to precipitate crystalline N-furfuryl-L-phenylalanine. When recrystallized from 50% acetic acid, the needle-shaped crystals weighed 22.5 g. (46% yield) and melted at 241° C. $[\alpha]_D^{27} = +30.50°$ (c.=2.00, 1 N HCl).

Elementary analysis.—Calculated for $C_{15}H_{15}NO_3$ (percent): C, 68.53; H, 6.16; N, 5.71. Found (percent): C, 68.19; H, 6.15; N, 5.66.

EXAMPLE 7

A solution of 4.29 g. β-naphthylamine in 35 ml. 60% ethanol was added to a mixture of 2.67 g. L-alanine, 9 ml. 37% formaldehyde solution, and 35 ml. 60% ethanol. A small amount of amorphous precipitate was removed by filtering, and the filtrate was evaporated in a vacuum. The residue was mixed with acetone and stored in a refrigerator to precipitate crystals of N-β-naphthylaminomethyl-L-alanine which were filtered off, washed with acetone, and recrystallized from dimethylsulfoxide. The purified columnar crystals weighed 2.45 g. (50% yield) and melted at 264° C. $[\alpha]_D^{30} = -25.92°$ (c.=0.54, 0.2 N NaOH).

Elementary analysis.—Calculated for $C_{14}H_{16}O_2N_2$ (percent): C, 68.81; H, 6.60; N, 11.47. Found (percent): C, 70.48; H, 5.72; N, 11.03.

EXAMPLE 8

14.9 g. DL-methionine, 30 ml. 37% formaldehyde solution, and 150 ml. 33% ethanol were kept at 50° C. until a homogeneous solution was formed to which a solution of 14.3 g. β-naphthylamine in 100 ml. 60% ethanol was added. The resulting reaction was exothermic, and a small amount of amorphous material precipitated and was filtered off. The filtrate was stored for severay days, whereby crystals of N-β-naphthylaminomethyl-DL-methionine were precipitated. They were recovered by filtration, washed with 50% ethanol, and dissolved in aqueous ammonia. A small amount of insoluble material was removed by filtering, and the filtrate was barely acidified with dilute acetic acid to precipitate purified, platelet-shaped crystals which were filtered off, washed with water and acetone, and dried. They weighed 3.8 g. (66% yield) and melted at 235° C.

Elementary analysis.—Calculated for $C_{16}H_{20}O_2N_2S$ (percent): C, 63.13; H, 6.58; N, 9.21. Found (percent): C, 63.79; H, 6.24; N, 8.79.

EXAMPLE 9

A solution of 14.3 g. β-naphthylamine in 100 ml. 60% ethanol was added to 13.1 g. 6-aminocaproic acid and 30 ml. 37% formaldehyde solution in 125 ml. 60% ethanol. An exothermic reaction occurred and a small amount amount of insoluble material was filtered off. The filtrate was evaporated in a vacuum until crystals precipitated. The precipitate was recovered by filtering, washed with acetone, and recrystallized from absolute ethanol. The purified, plate-shaped crystals of 6-(β-naphthylaminomethyl)-aminocaproic acid weighed 20.3 g. (81% yield) and melted at 127 °C.

*Elementary analysis.*—Calculated for $C_{15}H_{18}O_2N_2$ (percent): C, 69.72; H, 7.02; N, 10.80. Found (percent): C, 70.44; H, 7.03; N, 10.41.

EXAMPLE 10

22 g. lauroyl chloride in 44 ml. ether were added at room temperature to a solution of 16.5 g. L-phenylalanine and 16 g. sodium hydroxide in 120 ml. water. The mixture was stirred for three hours and then acidified to Congo red with dilute hydrochloric acid. The precipitated crystals of N-lauroyl-L-phenylalanine were filtered off, washed with water, and recrystallized from acetone. They were then plate-shaped, weighed 25 g. (73% yield), and melted at 97° C. $[\alpha]_D^{29} = +20.00°$ (c.=1.05, absolute ethanol).

*Elementary analysis.*—Calculated for $C_{21}H_{33}O_3N$ (percent): C, 72.56; H, 9.57; N, 4.03.
Found (percent): C, 71.71; H, 9.63; N, 3.93.

EXAMPLE 11

A solution of 9.5 g. 4-toluenesulfonyl chloride in 50 ml. ether was added dropwise to a solution of 10.2 g. DL-tryptophan and 12 g. sodium hydroxide in 120 ml. water over a period of 40 minutes with stirring. The reaction mixture was stirred for three hours more and acidified with hydrochloric acid to precipitate N-4-toluenesulfonyl-DL-tryptophan. The crystals recovered by filtering were washed with water and recrystallized from ethanol. They weighed 10.5 g. (59% yield), were needle-shaped, and melted at 184° C.

*Elementary analysis.*—Calculated for $C_{18}H_{18}O_4N_2$ (percent): C, 60.31; H, 5.06; N, 7.81.
Found (percent): C, 60.47; H, 5.19; N, 7.67.

EXAMPLE 12

A solution of 5.3 g. 2-fluorenesulfonyl chloride in 150 ml. acetone was added dropwise over a period of 30 minutes with stirring to a solution of 1.8 g. β-alanine in a mixture of 10 ml. 10% sodium hydroxide and a solution of 5.3 g. sodium carbonate in 50 ml. water at room temperature. Stirring was continued for 30 minutes on a water bath at 50° C., and for three hours more at room temperature. When the reaction mixture was then acidified with dilute hydrochloric acid and acetone removed by vacuum distillation, N - 2-fluorenesulfonyl-β-alanine crystallized. The crystals were filtered off, washed with water, and recrystallized from dioxane. The purified, plate-shaped crystals weighed 5.5 g. (87% yield) and melted at 187° C.

*Elementary analysis.*—Calculated for $C_{16}H_{15}O_4NS$ (percent): C, 60.55; H, 4.76; N, 4.41.
Found (percent): C, 60.54; H, 4.58; N, 4.30.

EXAMPLE 13

A solution of 8 g. 2-fluorenesulfonyl chloride in 240 ml. acetone was added dropwise with stirring at room temperature to a solution of 3.5 g. L-valine in a mixture of 20 ml. 10% sodium hydroxide solution and 5.3 g. sodium carbonate in 50 ml. water. The reaction mixture was stirred at 50° C. for 30 minutes on a water bath, and for three additional hours at room temperature, whereupon it was acidified and partly evaporated in a vacuum to remove the acetone and to induce crystallization of N-2-fluorenesulfonyl-L-valine. The crystals were filtered off, washed with water, and recrystallized from dilute acetone. The purified columnar crystals weighed 7.0 g. (70% yield) and melted at 220° C. $[\alpha]_D^{27} = +22.33°$ (c=2.060, acetone).

*Elementary analysis.*—Calculated for $C_{18}H_{19}O_4NS$ (percent): C, 62.58; H, 5.54; N, 4.05.
Found (percent): C, 62.43; H, 5.57; N, 3.77.

EXAMPLE 14

A solution of 5.3 g. 2-fluorenesulfonyl chloride in 150 ml. acetone was stirred dropwise over a period of 30 minutes into a solution of 4.2 g. DL-4-nitrophenylalanine in a mixture of 20 ml. 10% sodium hydroxide solution and 5.3 g. sodium carbonate in 50 ml. water at room temperature. The reaction mixture was thereafter stirred for 30 minutes at 50° C. on a water bath and then for three hours at room temperature. Upon acidifying with dilute hydrochloric acid and evaporation of the acetone, crystalline N - 2 - fluorenesulfonyl-DL-4-nitrophenylalanine was precipitated. The crystals were filtered off, washed with water, and recrystallized from dioxane. The purified, very small crystals weighed 5 g. (57% yield) and melted at 261° C.

*Elementary analysis.*—Calculated for $C_{22}H_{18}O_6N_2S$ (percent): C, 60.21; H, 4.13; N, 6.38.
Found: (percent): C, 60.06; H, 4.31; N, 6.12.

EXAMPLE 15

2.33 g. (0.01 mole) N-carboxymethyl-L-phenylalanine was added to a 5% aqueous solution containing 0.84 g. (0.01 mole) sodium bicarbonate to form a clear solution. The solution was concentrated under reduced pressure to crystallize out sodium salt of N-carboxymethyl-L-phenylalanine.

The sodium salts of the other thirteen N-substituted amino acids were prepared by the same manner.

EXAMPLE 16

2.55 g. (0.01 mole) N-benzyl-L-phenylalanine was added to a 10% aqueous solution containing 0.56 g. potassium hydroxide to form a clear solution. And then the solution was concentrated under reduced pressure to crystallize out potassium salt of N-benzyl-L-phenylalanine.

The potassium salts of the other thirteen N-substituted amino acids were prepared by the same manner.

EXAMPLE 17

2.45 g. (0.01 mole) N-furfuryl-L-phenylalanine was added to an excess amount of 28% concentrated aqueous ammonia solution to form a clear solution. The solution was concentrated under reduced pressure to crystallize out ammonium salt of N-furfuryl-L-phenylalanine.

The ammonium salts of the other thirteen N-substituted amino acids were prepared by the same manner.

EXAMPLE 18

2.23 g. (0.01 mole) N-carboxymethyl-L-phenylalanine was added to an aqueous solution containing 0.61 g. (0.01 mole) monoethanolamine to form a clear solution. And the monoethanolamine salt was prepared by concentration of the solution. Similarly, diethanolamine salt was obtained by using an equivalent amount of diethanolamine in place of monoethanolamine.

The mono or diethanolamine salts of the other thirteen N-substituted amino acids were prepared by the same manner.

EXAMPLE 19

One thousand capsules for oral use, each containing 200 mg. of Compound 3 (N-carboxymethyl-L-phenylalanine as prepared in Example 3) were prepared from the following types and amounts of materials:

| | G. |
|---|---|
| Compound 3 | 200 |
| Corn starch | 150 |
| Talc | 80 |
| Magnesium stearate | 2.6 |

The materials were throughly mixed and then capsulated in the usual manner. The foregoing capsules are useful for the treatment of infection with influenza virus by the oral administration of 1 to 2 capsules every 6 hours.

This procedure may be similarly applied to prepare capsules containing one or more of the other thirteen N-substituted amino acids.

EXAMPLE 20

One thousand tablets for oral use, each containing 200 mg. of Compound 3 were prepared from the following type and amounts of materials:

| | G. |
|---|---|
| Compound 3 | 200 |
| Lactose | 50 |
| Corn starch | 30 |
| Magnesium stearate | 3.0 |
| Light liquid petrolatum | 1.2 |

The ingredients were thoroughly mixed and slugged. The slugs were broken down by forcing through a number sixteen screen. The resulting granules were then compressed into tablets, each tablet containing 200 mg. Compound 3.

The above procedure may be similarly applied to prepare tablets containing one or more of the other thirteen N-substituted amino acids.

EXAMPLE 21

A sterile aqueous solution for intramuscular use, containing in 1 ml. 200 mg. of Compound 3, as the sodium salt was prepared from the following types and amount of ingredients:

Compound 3: 200 mg.
Sodium hydroxide: 10% solution
Water for injection: 1000 ml.

Compound 3 was added to the water and sufficient sodium hydroxide was added to form a solution of pH 7.2. The solution was sterilized by filtration. The sterile solution in the amount of 1 ml. was aseptically filled into sterile vials and frozen. The water was removed under high vacuum and the vials containing the lyophilized powder were sealed. Just prior to use, sufficient sterile water for injection to make 1 ml. of solution was added to the vial.

The above procedure may be similarly applied to prepare parenteral solution containing sodium salt of the other N-substituted amino acid.

These compositions and analogous compositions containing the other active agents of the invention were used successfully in the treatment of many influenza strains, the results being consistent with those specifically described hereinafter with reference to two particularly virulent strains.

The physiological effects of the compounds of the invention are illustrated by the following examples:

EXAMPLE 22

The several N-substituted amino acids of the invention prepared as described in Examples 1 to 14 were dissolved in dilute aqueous sodium bicarbonate, the solutions were sterilized by passage through a microporous filter, and single doses of varying strength were injected intraperitoneally into mice in a standard toxicity test, male mice weighing 10–12 g. each being employed in all tests described below. The mean lethal dosage ($LD_{50}$) was determined one week after the injection. The results obtained are shown in Table 1 in which the several N-substituted amino acids of the invention are identified by numbers referring to Examples 1–14 in which their preparation is described. For comparison purposes, the known antiviral agent Amantidine (1-Adamantanamine) was also tested.

TABLE 1

| Compound: | $LD_{50}$, mg./kg. |
|---|---|
| 1 | 300 |
| 2 | 400 |
| 3 | 1500 |
| 4 | 1500 |
| 5 | 1500 |
| 6 | 950 |
| 7 | >1500 |
| 8 | >1500 |
| 9 | 950 |
| 10 | 200 |
| 11 | 850 |
| 12 | 375 |
| 13 | 375 |
| 14 | >1500 |
| Amantadine | 233 |

EXAMPLE 23

Groups of ten mice each were injected intraperitoneally with single doses of solutions of the 14 compounds of the invention and of Amantadine, prepared as in Example 17, and with physiological saline solution as a control, 48 hours after having been infected intranasally with influenza virus A–2/Adachi/Tokyo 57. The mice surviving 14 days after the infection were sacrificed, and the lungs of all tested mice were inspected for consolidation. The observations made were evaluated according to Ledinko's criteria, assigning scores as follows:

5: Mouse died within 5 days after infection and entire lung was consolidated.
4: Mouse survived at least 5 days, but entire lung was consolidated.
3: 75% of lung consolidated.
2: 50% of lung consolidated.
1: 25% of lung consolidated.
0.5: 5–15% of lung consolidated.

Table 2 lists the mean values and standard error of scores for each group of ten mice and the dosage employed which was approximately ⅕ of $LD_{50}$.

TABLE 2

| | Compound | | | | | | | | | | | | | | Amantadine | Control |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | | |
| Dosage, mg./kg. | 60 | 100 | 300 | 300 | 300 | 200 | 300 | 300 | 200 | 40 | 170 | 80 | 80 | 300 | 60 | |
| Mean score | 2.6 | 2.6 | 2.5 | 2.2 | 2.6 | 2.2 | 2.6 | 2.8 | 2.5 | 2.0 | 2.6 | 2.8 | 2.6 | 2.0 | 2.6 | 4.6 |
| Std. error | 1.7 | 1.7 | 1.7 | 1.1 | 1.8 | 1.3 | 1.4 | 1.2 | 1.6 | 1.4 | 1.2 | 1.2 | 1.0 | 1.3 | 2.0 | 1.9 |

EXAMPLE 24

In an additional test series, groups of ten mice infected as in Example 23 were treated 72 hours after the infection by intraperitoneal injection with the compounds of the invention and Amantadine in the dosages listed in Table 2. Ten hours later, the injections were repeated. A control group of mice received physiological saline solution only, and an additional comparison group received 60 mg./kg. of Rimantadine, another known antiviral agent.

The mice were sacrificed 96 hours after the last injection. The lungs were removed, and their virus content was estimated by standard determination of the mean Egg Infective Dosis ($EID_{50}$). The values of $EID_{50}$ were below $10^{1.5}$ for each of the fourteen tested compounds of the invention, $10^{3.5}$ for Rimantadine, and $10^{4.5}$ for Amantadine as well as for the untreated control group.

The results of Examples 23 and 24 show that the antiviral effects of the compounds of the invention in doses of approximately equal toxicity compare favorably with known antiviral agents when applied to standard laboratory mice if the treatment is given 48 hours after the infection, but that the compounds of the invention are still effective when applied 72 hours after infection whereas the known agents have only minimal or unmeasurable effects under such conditions.

for consolidation. The results were as shown in Table 4. The dosage employed was 300 mg./kg. for the compounds whose $LD_{50}$ values are higher than 1500 mg./kg. while it was approximately ⅕ of $LD_{50}$ for the other compounds.

TABLE 4

| | Compound | | | | | | | | | | | | | | Amantadine | Control |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | | |
| Dosage, mg./kg | 180 | 300 | 300 | 300 | 300 | 300 | 300 | 300 | 300 | 120 | 300 | 250 | 250 | 300 | 150 | |
| Mean score | 2.8 | 3.0 | 2.9 | 3.2 | 3.6 | 3.2 | 3.0 | 2.6 | 3.4 | 3.8 | 3.2 | 3.0 | 3.1 | 2.9 | 3.4 | 4.8 |
| Std. error | 1.6 | 1.2 | 1.0 | 1.2 | 1.4 | 1.2 | 1.2 | 1.3 | 1.0 | 1.2 | 1.1 | 1.4 | 1.3 | 1.2 | 1.3 | 1.3 |

EXAMPLE 25

The antiviral effects of the 14 compounds of the invention toward influenza B type Lee strain virus were also tested under the similar condition as in Example 23.

Groups of ten mice each were injected intraperitoneally with single doses of the 14 compounds of the invention, 48 hours after having been infected intranasally with influenza B type Lee strain virus. The mice surviving 14 days after the infection were sacrificed, and the lungs of all tested mice were inspected for consolidation. The observations made evaluated according to Ledinko's criteria described already. The dosage employed was approximately ⅕ of $LD_{50}$.

The results were as shown in Table 3.

TABLE 3

| | Compound | | | | | | | | | | | | | | Amantadine | Control |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | | |
| Dosage, mg./kg | 60 | 100 | 300 | 300 | 300 | 200 | 300 | 300 | 200 | 40 | 170 | 80 | 80 | 300 | 60 | |
| Mean score | 2.6 | 2.5 | 2.1 | 2.7 | 2.1 | 1.8 | 2.0 | 2.8 | 2.2 | 2.4 | 2.0 | 2.1 | 2.0 | 1.9 | 4.1 | 4.2 |
| Std. error | 1.2 | 1.4 | 1.3 | 1.5 | 1.2 | 1.4 | 1.0 | 1.8 | 1.8 | 1.4 | 1.2 | 1.0 | 1.3 | 1.2 | 1.8 | 1.8 |

The results show that the known antiviral agent exhibits no effect toward influenza virus of B type whereas the compounds of the invention exhibit antiviral effects approximately equal with those toward influenza virus of A-2 type.

EXAMPLE 26

Each of the 14 compounds of the invention was suspended in carboxymethylcellulose and the suspension was orally administered into the ten mice infected as in Example 23 using a metallic tube, 48 hours after the infection. The mice surviving 14 days after the infection were sacrificed and the lungs of all tested mice were inspected

What is claimed is:

1. An N-substituted amino acid having antiviral activity and selected from the group consisting of N-4-nitrophenoxyacetyl - 4 - nitrophenylalanine, N-β-naphthylaminomethylalanine, and 6 - (β - naphthylaminomethyl)-aminocaproic acid.

2. An amino acid as set forth in claim 1, which is N-4-nitrophenoxyacetyl-DL-4-nitrophenylalanine.

3. An amino acid as set forth in claim 1, which is N-β-naphthylaminomethyl-L-alanine.

4. An amino acid as set forth in claim 1, which is N-(β-naphthylaminomethyl)-aminocaproic acid.

References Cited
UNITED STATES PATENTS 3,574,704  4/1971  Claassem et al. ____ 260—518 R LORRAINE A. WEINBERGER, Primary Examiner L. A. THAXTON, Assistant Examiner U.S. Cl. X.R.

260—326.14, 347.3, 404, 501.11, 516, 519; 424—274, 285, 319